United States Patent [19]

Stephenson et al.

[11] 3,758,131
[45] Sept. 11, 1973

[54] INFLATION APPARATUS FOR SAFETY DEVICE

[75] Inventors: Robert L. Stephenson, Sterling Heights; Donald G. Radke, Rochester, both of Mich.

[73] Assignee: Allied Chemical Corporation, New York, N.Y.

[22] Filed: Jan. 11, 1972

[21] Appl. No.: 217,052

[52] U.S. Cl. ........... 280/150 AB, 102/37.7, 102/39, 180/105, 200/61.53, 340/61
[51] Int. Cl. ............................................. B60r 21/08
[58] Field of Search .............. 280/150 AB; 180/103, 180/105; 102/37.7, 71, 74

[56] References Cited
UNITED STATES PATENTS

| | | | |
|---|---|---|---|
| 3,655,217 | 4/1972 | Johnson | 280/150 AB |
| 3,582,107 | 6/1971 | Goetz et al. | 280/150 AB |
| 3,663,035 | 5/1972 | Norton | 280/150 AB |
| 3,684,309 | 8/1972 | Uchiyamada | 280/150 AB |
| 3,532,360 | 10/1970 | Leising et al. | 280/150 AB |

Primary Examiner—Kenneth H. Betts
Assistant Examiner—John P. Silverstrim
Attorney—Jonathan Plaut et al.

[57] ABSTRACT

Safety apparatus disposed within a motor vehicle subject to impact for transmitting an electrical current from a power source to a gas releasing means connected to a gas containing portion of a gas source during a fixed time interval and to a plurality of gas generating charges within a gas generating portion of the gas source during successive time intervals at least two of which are caused to vary in inverse proportion to the impact velocity of the vehicle by means differently responsive to the impact velocity. Pressurized gas is released from the gas containing portion upon receipt of the electrical current by the gas releasing means. Gas generated by each charge receiving an electrical current enters the gas containing portion and admixes with the pressurized gas therein. As a result, the combined pressurized and generated gases pass into a bag, which inflates during a controlled time interval varying inversely with the impact velocity to a controlled pressure varying directly with the impact velocity.

14 Claims, 4 Drawing Figures

PATENTED SEP 11 1973 3,758,131

INFLATION APPARATUS FOR SAFETY DEVICE

BACKGROUND OF THE INVENTION

1. Field of the Invention

This invention relates to an improved safety device protecting passengers or other mobile objects in a motor vehicle subject to impact, and more particularly to apparatus for inflating a bag with gas during a controlled time interval varying inversely with the impact velocity to a controlled inflation pressure which varies directly with the impact velocity of a vehicle within which the bag is disposed.

2. Description of the Prior Art

Bag inflation apparatus of the type which this invention has improved is disclosed in the prior application of Lewis, Ser. No. 192,850, filed Oct. 27, 1971. According to that application, the inflation apparatus is disposed within a motor vehicle. An inflation time interval commences when the vehicle becomes involved in a collision, whereupon an electrical current is transmitted from a power source to a gas releasing means connected to a gas containing compartment of a gas source comprising part of the apparatus. The gas releasing means operate, upon receipt of the electrical current, to provide a gas outlet in the gas containing compartment, at which time gas stored under pressure therein begins to flow out of the compartment. The electrical signal also reaches and ignites a combustible gas generating material within a gas generating compartment. Gas developed by combustion of the gas generating material enters the gas containing compartment and mixes with at least a portion of the pressurized gas therein. The time interval between provision of the outlet and ignition of the gas generating material is caused to vary in inverse proportion to the impact velocity of the vehicle. Accordingly, the pressure of the released gas depends in part upon the amount of pressurized gas which becomes mixed with the generated gas. Gas released from the gas source is directed into a bag or cushion which inflates during a preselected time interval to protect passengers or other mobile objects within the vehicle.

Prior to the invention disclosed by Lewis, it had been determined that at relatively low impact velocities a bag inflated during a fixed time interval and at a constant pressure moves in the direction of an occupant within the vehicle at excessively high speeds. An occupant moving forward at the time of impact can be pushed backward with considerable force by the rapidly inflating bag. Increased inflation time intervals resulting in decreased inflation pressures provide some protection against such rebound problems but reduce the protection afforded during impact at higher velocities. Moreover the inflation pressure may be inadequately suited to protect the occupant even though the bag inflates during the proper time interval. The provision by Lewis of apparatus for releasing stored gas during a variable time interval before releasing gas from a single gas generating unit, while representing a significant advance in the art, has been found to be in need of improvement because the number of different velocities at which vehiclular impact can occur requires a greater variance in the inflation pressure than inherently results when a pressurized gas is variably admixed with gas supplied from a single gas generating charge. At certain impact velocities an inflation assembly such as the one disclosed by Lewis, which variably ignites a single charge of gas generating material to inflate an air cushion during a variable time interval, can result in inflation pressures somewhat higher or lower than those best suited to protect the occupant. The protection afforded to an occupant or other mobile object disposed within the vehicle can be significantly increased if upon impact of the vehicle, the bag inflates to a preselected pressure calculated as that best suited to protect the occupant. Such an optimum inflation pressure can be correlated with the impact velocity of the vehicle. The instant invention provides an improved apparatus of the type disclosed by Lewis, wherein increased control over the inflation pressure permits the bag to be inflated during a controlled time interval varying inversely with the impact velocity to a controlled pressure varying directly with the impact velocity.

SUMMARY OF THE INVENTION

Briefly stated the invention provides a safety apparatus disposed in a vehicle subject to impact for inflating a bag with gas from a hybrid gas source wherein a pressurized gas is variably admixed with gas generated upon ignition of a plurality of gas generating charges, and the number of gas generating charges ignited is caused to vary directly with the impact velocity of the vehicle. In a preferred embodiment, the apparatus includes means for transmitting an electrical current from a power source to a gas releasing means connected to a gas containing portion of a gas source within a fixed time interval and to a plurality of actuating means within successive time intervals each of which varies in inverse proportion to the impact velocity of the vehicle. Each of the actuating means is connected to one of the gas generating charges and ignites the charge to which it is connected upon receipt of the electrical current. An impact detecting means causes the current to pass from the power source to a first circuit means upon impact of the vehicle. The first circuit means transmits the current to the gas releasing means during the fixed time interval, thereby releasing pressurized gas from the gas containing portion. A plurality of additional circuit means are provided, each of such circuit means being connected to one of the actuating means, for transmitting the current from the power source to the actuating means during the successive time intervals. Means are provided for permitting gas developed by combustion of one or more of the gas generating charges to flow into the gas containing portion. The gas releasing means permits the pressurized gas, the generated gas, or a mixture thereof to flow into the bag upon receipt of the electrical current. Preferably the gas containing portion and each of the gas generating charges are respectively housed within separate compartments of a pressurized tank. Each gas generating charge is provided with a pressure sensitive barrier which forms a wall common to the compartment in which the pressurized gas and the charge are respectively housed. A control means is provided which comprises a plurality of control elements. Each control element is associated with one of the additional circuit means. The control elements are independently responsive to the impact velocity of the vehicle and vary the successive time intervals in inverse proportion to the impact velocity. At least two of the control elements have means which are differently responsive to the impact velocity, for varying the number of charges ignited. As a result, the combined pressurized and generated gases released upon impact of the vehicle flow into the bag, which inflates during a controlled time interval varying inversely with the impact velocity to a controlled pressure which varies directly with the impact velocity of the vehicle.

A unique means is thereby furnished for variably controlling both the time interval during which and the pressure to which the bag is inflated. For substantially any impact velocity, the bag can be caused to inflate during a time interval and to a pressure calculated to best protect the occupant. Since the noise associated with inflation of bags of the type described generally increases with increased inflation pressures, and since in accordance with the present invention, the bag need not be inflated to an inflation pressure greater than that preselected for each velocity, it is also possible to reduce the sound resulting from inflation. Accordingly, the invention affords increased protection against sound and rebound problems and, in general, results in a safer disposition of the bag when the vehicle which carries it is involved in a collision.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENT

The inflation time and pressure control means of the present invention may be fabricated in a number of relatively simple configurations. As a consequence the invention will be found to function with most varieties of bag inflation apparatus. For illustrative purposes, the invention is described in connection with a hybrid gas source having a gas containing portion provided with a pressurized gas and a gas generating portion provided with two gas generating charges. The number of gas generating charges may vary from as few as two to as many as 10 or more depending on the size of each charge, the pressure and volume of gas required to inflate the bag, the range of impact velocities within which the apparatus is intended to function, and the quantity of pressurized gas employed. Accordingly, the invention is intended to encompass modifications of the preferred embodiment which use a plurality of gas generating charges to inflate a bag to a controlled pressure during a controlled time interval.

Figure 1:
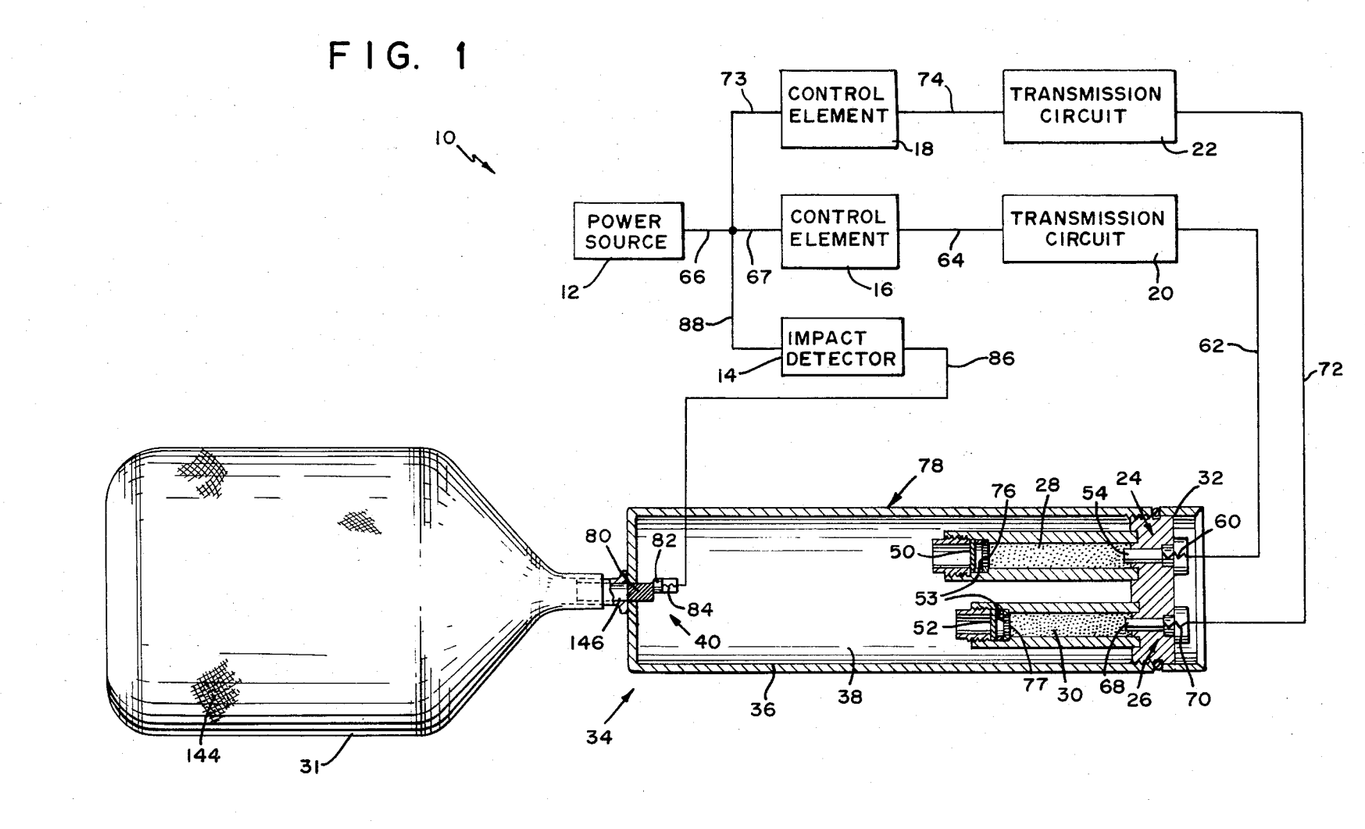
FIG. 1 is a diagrammatic representation of apparatus for transmitting an electrical current to gas releasing means connected to a gas containing portion of a gas source during a fixed time interval, and to a plurality of actuating means, each being connected to one of a plurality of gas generating charges within a gas generating portion of the gas source during successive time intervals.

Referring to the drawings, there is illustrated in FIG. 1, a preferred form of apparatus for delivering pressurized gas and generated gas into an inflatable bag. The apparatus shown generally at 10, includes a power source 12 which may comprise a battery of the type conventionally used in a motor vehicle. An auxiliary power supply, such as a capacitor connected in parallel to the battery, may be used as the power source in the event that the battery is not supplying power to the apparatus 10. The apparatus 10 further includes an impact detector 14, a first control element 16 and a second control element 18. Additional circuit means in the form of transmission circuits 20 and 22 are respectively associated with the first and second control elements 16 and 18. Transmission circuit 20 is connected to a first actuating means generally indicated at 24. A second actuating means generally indicated at 26 is connected to transmission circuit 22. The first and second actuating means 24 and 26 are respectively connected to a first and second gas generating charge 28 and 30 disposed within a gas generating portion 32 of a gas source, shown generally at 34. A pressurized gas 38 is stored within a gas containing portion 36 of the gas source 34. A gas releasing means, generally indicated at 40 is provided within the gas containing portion 36 for permitting pressurized gas 38 and gas developed by combustion of the gas generating charges 28 and 30 to flow into an inflatable bag 31 upon receipt of an electrical current from impact detector 14.

The gas source 34 utilizes a hybrid combination of pressurized gas and gas generating material. Nitrogen, air, argon or other suitable gas which can be stored for prolonged periods without leaking from a gas containing vessel is generally used as the pressurized gas. Black powder, nitrocellulose, composite propellant such as ammonium perchlorate and polyvinyl chloride, or other material which generates gas and heat upon combustion can be used as the gas generating material of which the gas generating charges are comprised. The pressurized gas is normally stored within the gas containing portion at a pressure in the range of about 1000 to 3000 pounds per square inch. In order to accommodate such pressure the gas containing portion 36 has a volume in the range of about 50 to 150 cubic inches, and preferably 100 cubic inches. Pressures exerted within the gas containing portion 36 by admixture of the stored and generated gases may increase the pressure in the gas containing portion 36 to a pressure in the range of 3000–7000 psi or more.

The volume and pressure of the pressurized gas 38 selected will depend upon the volume of the inflatable bag 31, and the pressure and volume of gas produced by the gas generating charges. In the embodiment shown in FIGS. 1 and 4, the volume and pressure of the pressurized gas 38 is at least about 25 percent of the combined volume and pressure of gas generated by combustion of the first and second gas generating charges 28 and 30. The volume of gas stored within the gas containing portion 36 can be varied in order to maximize the high pressure gas potential and minimize the volume of the gas source. In the preferred embodiment shown in FIGS. 1 and 4, the pressurized gas source is stored within the gas containing portion 36 in sufficient pressure and volume to substantially fill the bag 31.

The actuating means 24 and 26 each include a squib. Squib 54 is structurally connected to a resistance element, such as a bridge wire 60, which provides a suitable volume resistivity to heat and ignites squib 54, upon passage of an electrical current therethrough. The bridge wire 60 is electrically connected via line 62, transmission circuit 20 and line 64 to the first control element 16, which selectively connects the bridge wire 60 to line 67, line 66 and electrical power source 12 upon impact of a vehicle in which the apparatus 10 is disposed. Gas generating material of charge 28 is disposed adjacent to the squib 54. In like manner gas generating material of charge 30 is disposed adjacent to squib 68 of the actuating means 26. The squib 68 is structurally connected to a resistance element such as bridge wire 70, which provides substantially the same volume resistivity as bridge wire 60 upon passage of an electrical current therethrough. The bridge wire 70 is electrically connected via line 72, transmission circuit 22, and line 74 to the second control element 18, which selectively connects the bridge wire 60 to line 73, line 66 and electrical power source 12 upon impact of the vehicle.

Figure 4:
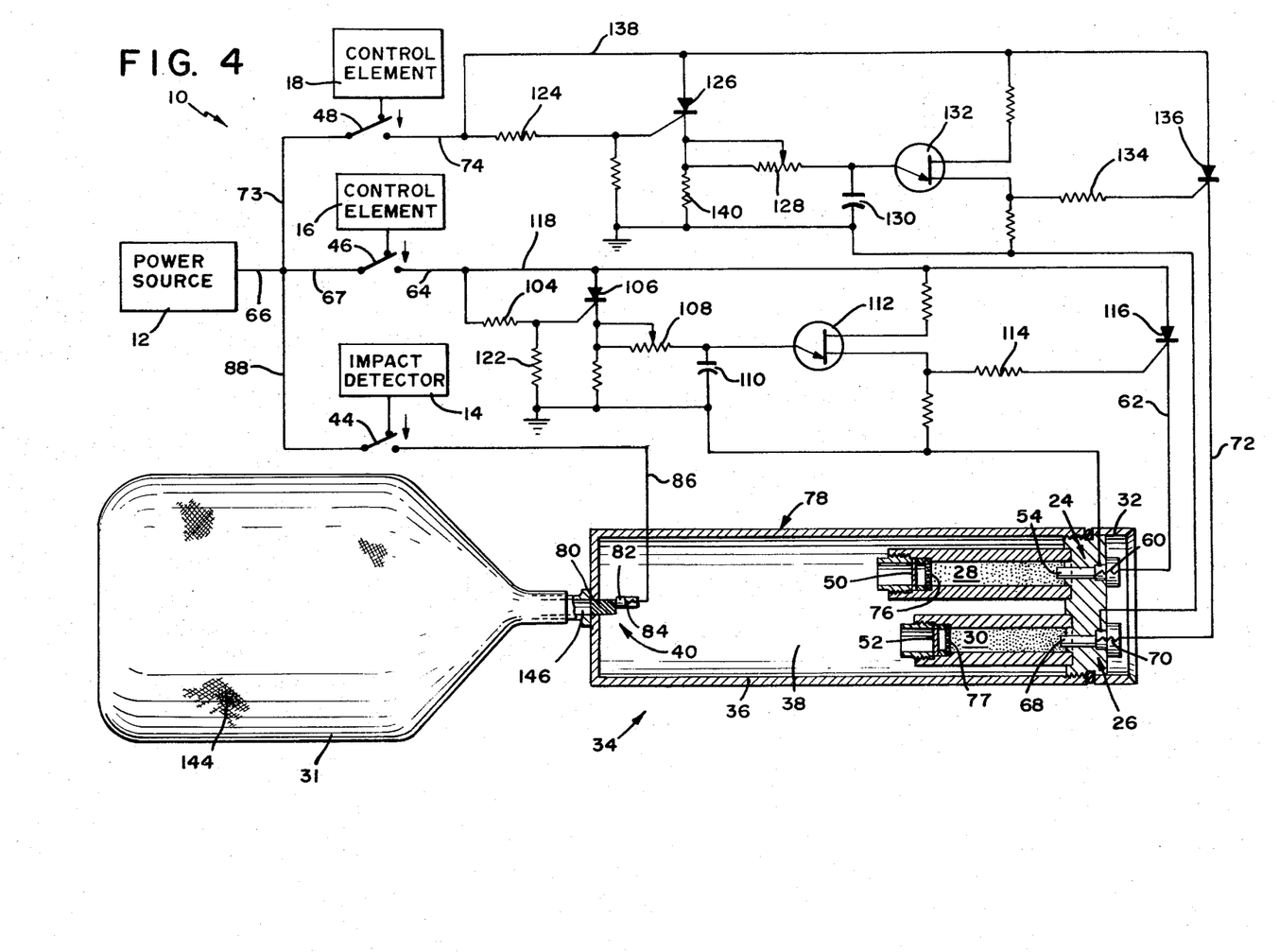
FIG. 4 is a schematic electrical diagram of a first circuit means and of two additional circuit means, each of the additional circuit means having electronic means for controlling the time interval during which an electrical current is transmitted from the power source to the actuating means.

In the hybrid gas source shown in FIGS. 1 and 4, the gas containing portion 36, the first gas generating charge 28 and the second gas generating charge 30 are respectively housed within separate compartments of a pressurized tank. Means are provided for permitting gas developed by combustion of the gas generating charges 28 and 30 to flow into the gas containing portion 36. Such means may comprise a plurality of pressure sensitive barriers, each being associated with one of the compartments housing a gas generating charge. In the embodiment of FIGS. 1 and 4, for example, a pressure sensitive barrier 50 provides a wall separating charge 28 from the pressurized gas 38. The gas generating charge 30 is similarly separated from the pressurized gas 38 by barrier 52. Each of the barriers 50 and 52 is designed to rupture when the pressure of gas generated by combustion of the charge with which it is respectively associated exceeds a preselected pressure, as in the range of approximately 3000 to 5000 pounds per square inch. Alternatively, either barrier can be removed after generation of the preselected pressure within its respective compartment by exploding an explosive charge (not shown) upon receipt of an electrical current from the power source 12. In the embodiment illustrated in FIGS. 1 and 4, the barriers 50 and 52 are in axial alignment with the axis of the gas containing portion 36 of the gas source 34. This disposition of the barriers 50 and 52 in relation to the gas containing portion 36 permits a simple and efficient flow of gas generated in the gas generating portion 32 through the gas containing portion 36. The barriers 50 and 52 may be constructed of plastic or other suitable material.

Diffusers 76 and 77 are disposed at the downstream end of the compartments in which the gas generating charges are respectively housed and immediately upstream of the barriers 50 and 52. The diffusers contain a plurality of passageways 53 which cause gas generated by combustion of the charges 28 and 30 to move into the gas containing portion 36 at a uniform pressure and velocity.

Because of the pressures which are maintained within the gas containing portion 36, the gas source 34 is provided with a relatively thick housing, shown generally at 78. The thickness of the housing 78 is designed to insure the structural integrity thereof if the housing 78 is subjected to pressures in excess of those anticipated. Preferably the housing is constructed of steel or other suitable metal.

The gas releasing means 40 is disposed within the gas containing portion of the gas source 34 at the downstream end of the housing 78. Such means include an outlet plug 80 removably mounted within the housing 78. The plug 80 extends through a full thickness of the housing 78 and into contact with the pressurized gas 38 contained therein. An explosive charge, such as a detonator 82 is located adjacent to the plug 80. Detonator 82 is structurally connected to a resistance element, such as a bridge wire, 84. The bridge wire 84 is electrically connected through line 86 to line 88, line 66 and power source 12 by impact detector 14 upon impact of the vehicle.

Figure 2:
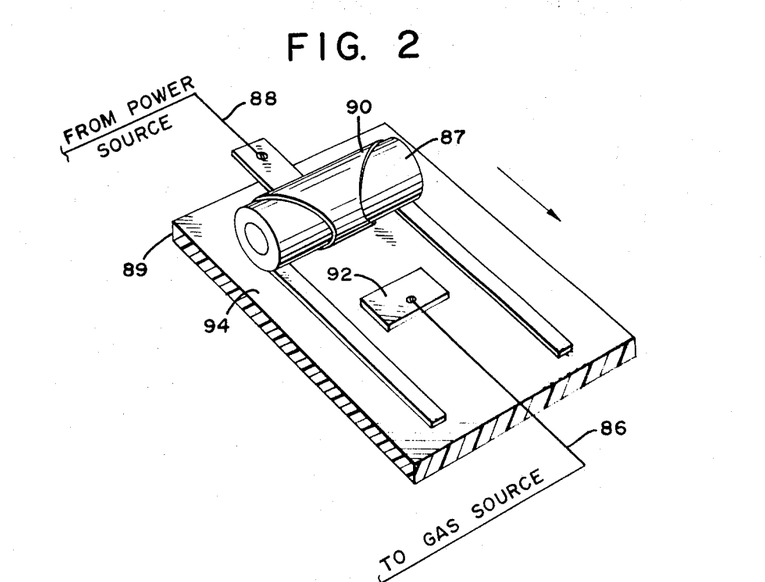
FIG. 2 is an isometric view of an impact detecting means for use with the apparatus of FIG. 1.

In FIG. 2 there is illustrated one form of an impact detecting means. Other forms of impact detecting means can also be used. The impact detecting means shown in FIG. 2 should therefore be interpreted as illustrative and not in a limiting sense. Such means may include at least one roller 87 of metal such as stainless steel, gold plated copper, or other suitable conductive material. The roller 87 is electrically connected via lines 88 and 66 to the power source 12 and is movably mounted on a non-conductive support 89 made, for example of plastic, polycarbonate, glass or ceramics. A thin band of electroconductive material 90, such as stainless steel, gold plated copper or the like, wrapped around the roller 87 and spot welded or otherwise secured to support 89 provides a resisting force hereinafter referred to as the first resisting force, against which the roller 87 acts. Conductive element 92, comprised of electroconductive material of the type used to make band 90 is fixedly mounted on support 89. If roller 87 is displaced along the surface 94 of support 89 in the direction of the arrow by forces resulting from impact of the vehicle, band 90 is brought into contact with the conductive element 92. An electrical current is transmitted from the power source 12 through line 66, line 88, impact detector 14 and a first circuit means comprising line 86 to the detonator 82 of gas releasing means 40.

Figure 3:
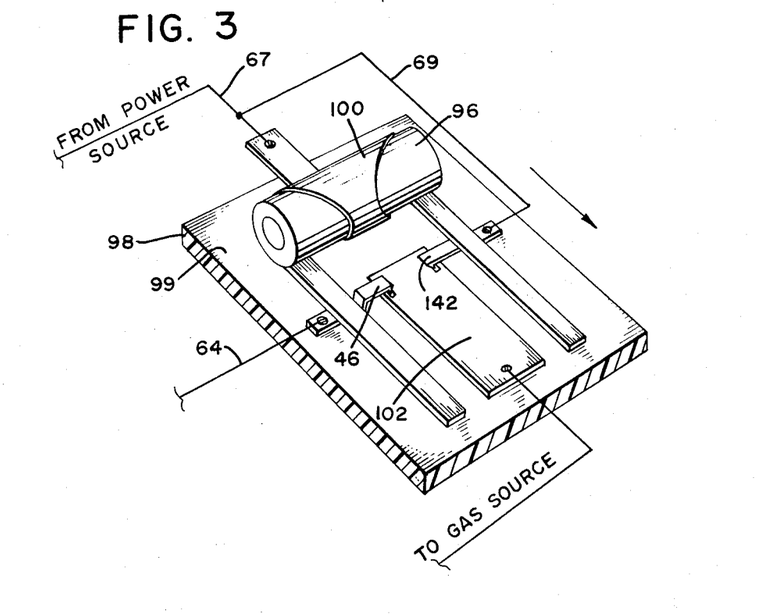
FIG. 3 is an isometric view of a control element for use with the apparatus of FIG. 1.

In FIG. 3 there is illustrated one type of the control elements which comprise the control means. The control element shown in FIG. 3 is intended to be illustrative and should not be interpreted to limit the scope of the invention to the particular structure disclosed. Such control element comprises at least one roller 96 of metal such as stainless steel gold plated copper, or other suitable conductive material. The roller 96 is electrically connected to the power source 12 and movably mounted on a nonconductive support 98 of the same material as support 89. A thin band 100 of electroconductive material, such as stainless steel, gold plated copper, or the like, wrapped around roller 96 and spotwelded or otherwise secured to support 98, provides a resisting force against which the roller 96 acts. Such resisting force, hereinafter referred to as the second resisting force, has a magnitude at least equal to and preferably greater than the first resisting force. Resistance element 102 is electrically connected to actuating means 24. As roller 96 is displaced along the surface 99 of support 98 in the direction of the arrow, band 100 is brought into contact with a variable portion of resistance element 102. Due to the second resisting force provided against roller 96 by band 100, the displacement distance of roller 96 can be made directly proportional to the impact velocity of a vehicle carrying apparatus 10. As the impact velocity is increased, roller 96 is displaced further along support 98 in the direction of the arrow. The electrical current from power source 12 passes through a correspondingly larger portion of band 100 and through a correspondingly smaller portion of the resistance element 102. Accordingly, the time interval during which the electrical current travels from the power source 12 through line 66, line 67, control element 16, and a second circuit means comprising line 64, transmission circuit 20, and line 62 to the first actuating means 24 decreases.

The second control element 18 is electrically connected to the power source 12 and to actuating means 26. Such control element is constructed and operated in substantially the same manner as the first control element 16, with the exception that the preselected resisting force against which its roller acts, hereinafter referred to as the third preselected resisting force, is of a greater magnitude than the second preselected resisting force. Accordingly, the time interval during which the electrical current travels from the power source 12 through line 66, line 73, the second control element 18 and a third circuit means comprising line 74, the second transmission circuit 22, and line 72 to the second actuating means 26 (1) is of at least the same duration as the time interval during which the current passes through the second circuit means, and (2) varies inversely with the impact velocity of the vehicle.

It will be understood that the current from power source 12 which is directed by impact detector 14 through the first circuit means to the gas releasing means 40 is not variably delayed in the same manner. Thus, at lower impact velocities the electrical current reaches and fires detonator 82 before reaching and igniting the squib 54. At such velocities, gas 38 is released from the gas containing portion 36 of the gas source 34 before combustion of the gas generating material of charge 28 commences. The time interval between release of gas from the gas containing portion 36 and ignition of the first gas generating charge 28 of gas source 34 is, in effect, the time interval during which the current passes from the power source 12 through the second circuit means to the first actuating means 24. Control element 16 can be employed to make that time interval vary in inverse proportion to the impact velocity of the vehicle. Inasmuch as control element 16 and control element 18 are differently responsive to the impact velocity, the current may pass through the second and third circuit means during respectively different time intervals. Alternatively, for relatively high impact velocities the current may be caused to pass through the first, second and third circuit means during substantially the same time interval. Moreover, when the first, second and third preselected resisting forces are each of different magnitude, the bag can be inflated by (1) pressurized gas 38 solely, (2) pressurized gas and gas generated upon ignition of charge 28, the ignition occuring either simultaneously with or a variable time interval after release of the pressurized gas, (3) pressurized gas and gas generated upon ignition of charges 28 and 30, the respective ignitions occuring sequentially and subsequent to release of the generated gas, and (4) pressurized gas and gas generated upon ignition of charges 28 and 30, the respective ignitions occurring simultaneously with release of the pressurized gas 38.

A unique means is thereby provided for varying the number of gas generating charges ignited in direct proportion with the impact velocity of the vehicle. Such means provide increased control over the amount of heat and gas developed by combustion of the gas generating charges. The controlled quantity of gas and heat is variably admixed with pressurized gas which is present within the gas containing portion 36 when the pressure sensitive barriers rupture and generated gas enters the gas containing portion 36. Since detonator 82 may explode and dislodge plug 80 prior to or simultaneously with ignition of one or more of the gas generating charges, the amount of pressurized gas remaining within the gas containing portion 36 upon rupture of the barrier means also varies.

It has been found that the bag 31 can be inflated during a time interval and to an inflation pressure which will best protect the occupant when vehicular impact occurs by (1) causing the amount of gas and heat developed by combustion of the gas generating charges to vary directly with the vehicle impact velocity, and (2) causing the amount of pressurized gas present within the gas-containing portion 36 upon rupture of the barrier means to vary directly with the impact velocity. As long as the gas source 34 comprises a pressurized gas 38 which can be released, as described, independently of gas generated from a plurality of gas generating charges at least two of which have actuating means connected via separate circuit means to control elements having means differently responsive to the impact velocity, the bag 31 can be inflated during a controlled time interval which varies inversely with the impact velocity to a controlled inflation pressure which varies directly with the impact velocity. In a preferred embodiment of the invention, such impact velocity may range from about five to about 90 miles per hour.

In FIG. 4 there is shown, schematically, an electrical diagram of the first, second, and third circuit means, the electrical current from power source 12, line 66 and line 88 passes through switch means 44, which is thrown in the direction of the arrow by impact detector 14. The electrical current then passes through line 86 directly to the detonator 82 of gas releasing means 40. Control element 16 is provided with a separate switch means 46 which operates independently of switch means 44. When switch means 46 is thrown, the electrical current from power source 12, line 66 and line 67 passes through the switch means 46 to line 64. The current then passes through resistors 104, silicon controlled rectifier 106 and variable resistor 108, charging capacitor 110. When the peak point of unijunction transistor 112 is reached, the current is emitted from the unijuction transistor 112 in the form of an electrical pulse, which passes through resistor 114 to silicon controlled rectifier 116. Such pulse produces a voltage at the rate of silicon controlled rectifier 116, which allows the current to flow through line 118, silicon controlled rectifier 116 and line 62 to bridge wire 60 of actuating means 24. Resistors 104 and 114 limit current passing through the gates of silicon controlled rectifiers 106 and 116, respectively. Resistor 120 functions to bleed down the capacitor 110 during shutdown when power is not supplied to the apparatus 10 by source 12.

Control element 18 is provided with switch means 48 which operates independently of switch means 44 and 46. When switch means 48 is thrown in the direction of the arrow, the electrical current from power source 12, line 66 and line 73 passes through the switch means 48 to line 74. The current then passes through resistor 124, silicon controlled rectifier 126 and variable resistor 128, charging capacitor 130. When the peak point of unijunction transistor 132 is reached, the current is emitted from the unijunction transistor in the form of an electrical pulse, which passes through resistor 134 to silicon controlled rectifier 136. Such pulse produces a voltage at the gate of silicon controlled rectifier 136, which allows the current to flow through line 138, silicon controlled rectifier 136 and line 72 to bridge wire 70 of actuating means 26. Resistors 124 and 134 limit current passing through the gates of silicon controlled rectifiers 126 and 136, respectively. Resistor 140 functions to bleed down the capacitor 130 during shutdown when power is not supplied to the apparatus 10 by source 12.

The apparatus 10 which has been disclosed herein can, of course, be modified in numerous ways without departing from the scope of the invention. As mentioned hereinabove, the number of gas generating charges and additional circuit means employed can vary from as few as two to as many as ten or more. Transmission circuit 20 could be simplified by eliminating resistor 104, silicon controlled rectifier 106 and resistor 122. Similar modifications could be made to the transmission circuit 22. As shown in FIG. 3, switch 46 of control element 10 is mounted on support 98 below roller 96. Upon contact with roller 96, the electrical current from power source 12, line 66 and 67 passes through switch 46 to line 64. An electroconductive member such as an additional switch 142 connected to line 67 by line 69 can be mounted on support 98 below roller 96. Upon contact with roller 96 switch 142 can be made to connect line 67 and line 69 with resistance elememt 102 for a preselected time interval of longer duration than the time interval during which the current passes through the second circuit means to the actuating means 24. Accordingly, in this embodiment, the time interval during which the electrical current passes from line 67 to the resistance element 102 will be of at least the same duration as the time interval during which the current passes from line 67 through the second circuit means to the actuating means 24, even if the resistor 104, silicon controlled rectifier 106 and resistor 122 are eliminated from the transmission circuit 20. Such modifications are intended to fall within the scope of my invention as defined by the subjoined claims.

As discussed in connection with FIG. 1, the apparatus 10 includes a bag 31 which is inflated by gas 26 from gas source 34 upon impact of a vehicle in which the apparatus 10 is disposed. At least a portion 144 of the fabric comprising bag 31 is generally provided with sufficient porosity to permit some of the inflating gas which enters the bag 31 to pass through the porous portion 144 and out of the bag 31. In this manner the bag can be made to collapse at a preselected rate. The bag is fully inflated and commences to collapse before contact with an occupant within the vehicle. Sufficient gas remains within the bag to prevent an occupant contacting the front of the bag from penetrating through the bag so as to contact hard portions of the vehicle on the reverse side of the bag. A "ride down" effect is thereby provided whereby upon impact of the vehicle the occupant contacts a softer medium and decelerates at a slower rate of speed. The present invention permits the bag to be inflated during a controlled time interval which varies inversely with the impact velocity of the vehicle to a controlled pressure which varies directly with the impact velocity of the vehicle. For each of a relatively wide range of impact velocities, bags inflated in accordance with the present invention can be made to collapse with sufficient speed to provide the softest medium and longest deceleration and yet retain sufficient gas within to prevent an occupant or other mobile object forced against the front of the bag from contacting hard portions of the vehicle on the reverse side of the bag.

In operation, forces resulting from impact of a vehicle in whch apparatus 10 is disposed displace roller 87 against the first preselecting resisting force and along the surface 94 of support 89 until band 90 is brought into contact with conductive element 92. An electrical current is transmitted from power source 12 through line 66, line 88, impact detector 14 and line 86 to bridge wire 84. The bridge wire heats and detonates the detonator 82 upon receipt of the electrical current. Such detonation dislodges the plug 80, whereupon an orifice (not shown) is created in communication with the gas containing portion 36 and a conduit 146. Presurized gas 38 commences to flow through the conduit 146 and into bag 31.

If forces resulting from impact of the vehicle are greater in magnitude than the second preselected resisting force, roller 96 is displaced along the surface 99 of support 98 until band 100 contacts switch means 46 and resistance element 102. The electrical current is transmitted from power source 12 through line 66, line 67, control element 16, line 64, transmission circuit 20 and line 62 to bridge wire 60 during a time interval controlled by control element 16. Squib 54 of actuating means 24 is heated and ignited by the bridge wire 60 upon receipt of the electrical current. The squib 54 ignites gas generating charge 28 and production of the generated gas commences. The gas pressure within the gas generating compartment housing charge 28 increases to preselected level, barrier 50 ruptures, and gas generated from charge 28 flows through the diffuser 76, the gas containing portion 36 and the conduit 146 into bag 31.

If forces resulting from impact of the vehicle are greater in magnitude than the third preselected resisting force, the current is transmitted from power source 12 through line 66, line 73, control element 18, line 74, transmission circuit 22 and line 72 to bridge wire 70 during a time interval controlled by control element 18. Squib 68 of actuating means 26 is heated and ignited by the bridge wire 70 upon receipt of the electrical current. The squib 68 ignites gas generating charge 30. The gas pressure within the gas generating compartment housing charge 30 increases to a preselected level, barrier 52 ruptures, and the gas generated from charge 30 flows through the diffuser 77, the gas containing portion 36 and the conduit 146 into bag 31, which inflates to provide a shock absorbing medium between hard portions of the vehicle and passengers or other mobile objects contained therein.

Having thus described the invention in rather full detail, it will be understood that these details need not be strictly adhered to but that various changes and modifications may suggest themselves to one skilled in the art, all falling within the scope of our invention as defined by the subjoined claims.

We claim:

1. Safety apparatus disposed within a vehicle subject to impact for inflating a bag during a controlled time interval which varies inversely with the impact velocity of the vehicle to a controlled pressure which varies directly with the impact velocity, comprising:
   a. a power source for supplying an electrical current;
   b. a gas source having a gas containing portion and a gas generating portion;
   c. a pressurized gas contained within the gas containing portion;
   d. a plurality of gas generating charges disposed within the gas generating portion;
   e. a plurality of actuating means, each such actuating means being connected to one of the gas generating charges, for igniting the charges upon receipt of the electrical current;
   f. means for permitting gas developed by combustion of the gas generating charges to flow into the gas containing portion;
   g. gas releasing means connected to the gas containing portion for permitting the pressurized gas, the generated gas, and mixtures thereof to flow into an inflatable bag upon receipt of the electrical current;
   h. a first circuit means for transmitting the electrical current from the power source to the gas releasing means during a fixed time interval;
   i. an impact detecting means for causing the electrical current to pass to the first circuit means upon impact of the vehicle;
   j. a plurality of additional circuit means, each such circuit means being connected to one of the actuating means for transmitting the current from the power source to said actuating means during successive time intervals;
   k. a plurality of control elements, each such control element being associated with one of said additional circuit means and being independently responsive to the impact velocity of the vehicle, for varying each of said successive time intervals in inverse proportion to said impact velocity; and
   i. at least two of said control elements having means differently responsive to said impact velocity for varying the number of charges ignited.

2. Apparatus as recited in claim 1, wherein the impact detecting means comprises a movable electroconductive material electrically connected to the power source and means for displacing said material against a preselected resisting force and into contact with an electroconductive element electrically connected to the gas releasing means.

3. Apparatus as recited in claim 2, wherein each control element comprises a movable electroconductive material electrically connected to the power source, a resistance element connected at one end to one of the additional circuit means, an electroconductive component connected to the other end of the resistance element, said electroconductive component being connected to said one of the additional circuit means, and means for displacing the electroconductive material against a preselected resisting force and into contact with the electroconductive component and a variable portion of the resistance element, the portion contacted varying in direct proportion to the distance that the electroconductive material is displaced by forces resulting from impact of the vehicle.

4. Apparatus as recited in claim 3, wherein the resisting force against which the electroconductive material of each control element is displaced has a magnitude at least as great as the resisting force against which the electroconductive material of the impact detecting means is displaced.

5. Apparatus as recited in claim 4, wherein the electroconductive material of at least one of the control elements is displaced against a preselected resisting force having a magnitude greater than the magnitude of the preselected resisting force against which another of the control elements is displaced, whereby at least two of said control elements have means differently responsive to the impact velocity.

6. Apparatus as recited in claim 4 wherein the electroconductive material of the impact detecting means and the electroconductive material of each of the control elements are each displaced against a resisting force of different magnitude.

7. Apparatus as recited in claim 5, wherein at least one of the control elements includes an electroconductive member electrically connected to the power source, means for displacing the electroconductive material of the control element into contact with said member, and means for holding the member in contact with a preselected portion of the resistance element for at least the time interval during which the current is transmitted through the additional circuit means associated therewith.

8. Apparatus as recited in claim 5, wherein each of the additional circuit means includes a transmission circuit connected to a control element, said transmission circuit comprising a variable resistor in series with means for transmitting an electrical current to an actuating means associated therewith.

9. Apparatus as recited in claim 8, wherein the electrical current is transmitted by means which include a unijunction transistor and a rectifier in series with the resistor and a bridge wire connected to the actuating means, and a capacitor connected in parallel with the power source.

10. Apparatus as recited in claim 9, wherein at least one of the control elements includes means for transmitting the current from the power source to the actuating means associated therewith upon contact of the electroconductive material with the resistance element, the time interval for said transmission being of at least the same duration as the time interval during which the electroconductive material contacts the resistance element.

11. Apparatus as recited in claim 9, wherein the gas source includes a housing enclosing the gas containing and generating portions, and the gas releasing means comprises a plug removably mounted in the housing, said plug extending through a full thickness of the housing and into contact with the pressurized gas, a detonator located adjacent to the plug, and a bridge wire structurally connected to the detonator and electrically connected to the impact detecting means, for detonating the detonator upon passage of the electrical current through the bridge wire, whereby the plug is removed from the housing.

12. Apparatus as recited in claim 11, wherein each of the actuating means comprises a squib disposed adjacent to the gas generating charge connected thereto, and a bridge wire structurally connected to the squib and electrically connected to one of the additional circuit means, for igniting the squib upon receipt of the electrical current, whereby the squib ignites the gas generating charge.

13. Apparatus as recited in claim 12, wherein the gas containing portion and each gas generating charge are respectively disposed within separate compartments of the housing, and at least one compartment in which one of the gas generating charges is housed includes a pressure sensitive barrier, said barrier providing the compartment with a wall separating the charge from the pressurized gas, whereby means are provided for permitting gas generated within the compartment to flow into the gas containing portion.

14. Safety apparatus disposed within a vehicle subject to impact for inflating a bag during a controlled time interval which varies inversely with the impact velocity of the vehicle to a controlled pressure which varies directly with the impact velocity, comprising a gas source having a gas contained within a gas containing portion, a plurality of gas generating charges disposed within a gas generating portion, means for igniting the charges, means for permitting gas developed by combustion of the gas generating charges to flow into the gas containing portion, and gas releasing means connected to the gas containing portion and responsive to impact of the vehicle for permitting the pressurized gas and the generated gas to flow into an inflatable bag, said means for igniting the charges being responsive to the impact velocity of the vehicle for varying the time interval in inverse proportion to the impact velocity and for varying the number of charges ignited.

* * * * *